(12) United States Patent
Takano et al.

(10) Patent No.: US 6,371,202 B1
(45) Date of Patent: Apr. 16, 2002

(54) VEHICLE AIR CONDITIONER

(75) Inventors: Yoshiaki Takano, Kosai; Satoshi Izawa, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/448,384

(22) Filed: Nov. 23, 1999

(30) Foreign Application Priority Data

Nov. 25, 1998 (JP) ............................................ 10-334390

(51) Int. Cl.[7] .................................................. F25B 29/00
(52) U.S. Cl. .................... 165/202; 165/203; 165/42; 165/43; 62/196.4; 62/244; 237/2 A
(58) Field of Search ........................... 165/42, 43, 202, 165/203, 2 A; 62/196.4, 244

(56) References Cited

U.S. PATENT DOCUMENTS

| 4,709,751 A | * 12/1987 | Ichimann et al. ............. 165/43 |
| 5,156,204 A | * 10/1992 | Doi .............................. 165/43 |
| 5,291,941 A | 3/1994 | Enomoto et al. ........... 62/196.4 |
| 5,309,731 A | * 5/1994 | Nonoyama et al. ............ 62/244 |
| 5,400,852 A | * 3/1995 | Nakae et al. ................ 165/205 |
| 5,699,960 A | * 12/1997 | Kato et al. ................... 237/2 A |
| 6,213,198 B1 | * 4/2001 | Shikata et al. ............... 165/203 |

FOREIGN PATENT DOCUMENTS

| JP | 5-124426 | * 5/1993 |
| JP | A-6-255341 | 9/1994 |

* cited by examiner

*Primary Examiner*—John K. Ford
(74) *Attorney, Agent, or Firm*—Harness, Dickey & Pierce, PLC

(57) ABSTRACT

In a vehicle air conditioner, during a cooling mode of a refrigerant cycle, refrigerant discharged from a compressor passes through a condenser and flows into a heat exchanger used as an evaporator after being press-reduced in a first press-reducing unit. On the other hand, during a heating mode of the refrigerant cycle, refrigerant discharged from the compressor is directly introduced into the heat exchanger used as a radiator after being press-reduced in a second press-reducing unit, while bypassing the condenser and the first press-reducing unit. During the heating mode or during the cooling mode when outside air temperature is low, a double layer flow mode is set so that outside air flows toward a defroster opening through a first air passage and inside air flows toward a foot opening through a second air passage partitioned from the first air passage. Thus, it can prevent a windshield from being fogged due to vaporization of condensed water on the heater exchanger during the heating mode.

12 Claims, 3 Drawing Sheets

VEHICLE AIR CONDITIONER

CROSS-REFERENCE TO RELATED APPLICATION

This application is related to and claims priority from Japanese Patent Application No. Hei. 10-334390 filed on Nov. 25, 1998, the contents of which are hereby incorporated by reference.

BACKGROUND OF THE INVENTION

1. Field of the Invention:

The present invention relates to a vehicle air conditioner having a hot-gas bypass function, in which hot-gas refrigerant discharged from a compressor is decompressed and is directly introduced into an evaporator while bypassing a condenser during a heating mode. More particularly, the present invention relates to a control unit which prevents a windshield from being fogged due to vaporization of condensed water on the evaporator when an operation mode of a refrigerant cycle is switched from a cooling mode to the heating mode.

2. Description of Related Art:

In a conventional vehicle air conditioner, hot water (engine-cooling water) is introduced into a heating heat exchanger in winter so that air is heated in the heating heat exchanger using hot water as a heating source. In this case, when temperature of hot water is low, temperature of air blown into a passenger compartment becomes lower and necessary heating capacity is not proposed for the passenger compartment.

To overcome this problem, U.S. Pat. No. 5,291,941 proposes a refrigerant cycle system having a hot-gas bypass function. In the conventional system, when temperature of hot water flowing into a heating heat exchanger is lower than a predetermined temperature, hot-gas refrigerant discharged from a compressor is directly introduced into an evaporator while bypassing a condenser so that air passing through the evaporator is heated by heat radiated from gas refrigerant. That is, in the conventional system, the cooling mode and the heating mode are selectively switched by a single heat exchanger disposed in an air-conditioning case.

However, when an inside air mode is set during the heating mode in winter to prevent polluted outside air from being introduced, air is necessary to be cooled and dehumidified in the evaporator for preventing a windshield of the vehicle from being fogged. Therefore, in this case, the cooling mode may be performed until temperature of outside air is lowered to 0° C. On the other hand, the heating mode with hot-gas refrigerant bypassing is generally performed when the temperature of outside air is not higher than 10° C. Thus, immediately after the cooling mode is performed at an outside air temperature about 0° C. for defogging the windshield, the heating mode with the hot-gas refrigerant bypassing may be need to be switched. In this case, temperature of the evaporator is quickly increased so that condensed water condensed on the evaporator during the cooling mode is evaporated. Therefore, air having a high humidity is blown into the passenger compartment, and the windshield may be fogged again. Further, even when the heating mode is not switched immediately after the cooling mode, when the heating mode with the hot-gas refrigerant bypassing is performed when the condensed water stays on the evaporator, the windshield may be fogged.

On the other hand, in a conventional vehicle air conditioner described in JP-A-6-255341, when a foot mode is selected for heating the passenger compartment, an inside/outside air double layer flow mode is set. During the double layer flow mode, outside air sucked by the first fan is introduced into a first air passage and is blown toward a vehicle windshield and the upper side of the vehicle from a defroster air outlet and a side face air outlet after passing through a refrigerant evaporator as a cooling unit and a refrigerant condenser as a heating unit. On the other hand, inside air sucked from the second fan is blown toward the lower side of the vehicle from a foot air outlet after passing through the refrigerant evaporator and the refrigerant condenser. However, in the conventional air conditioner, the cooling mode and the heating mode of the refrigerant cycle are not switched by a single heat exchanger, and the problem that the windshield is fogged with operation of the heating mode is not described any.

SUMMARY OF THE INVENTION

In view of the foregoing problems, it is an object of the present invention to provide a vehicle air conditioner having a refrigerant heat exchanger in which a cooling mode and a heating mode can be switched, while a windshield is prevented from being fogged due to vaporization of condensed water on the refrigerant heat exchanger during the heating mode.

According to the present invention, a vehicle air conditioner includes an air conditioning case for defining an air passage through which air is blown into a passenger compartment, a partition member for partitioning the air passage into a first air passage through which outside air outside the passenger compartment flows into a defroster opening and a second air passage through which inside air inside the passenger compartment flows into a foot opening during a double layer flow mode, a refrigerant cycle through which refrigerant flows, and a control unit. The refrigerant cycle includes a compressor for compressing and discharging refrigerant, a condenser for condensing refrigerant discharged from the compressor during a cooling mode, a first pressreducing unit for decompressing refrigerant from the condenser, a heat exchanger disposed in the air conditioning case for cooling air passing therethrough and for evaporating refrigerant from the first press-reducing unit during the cooling mode, a hot-gas bypass passage through which refrigerant discharged from the compressor is directly introduced into the evaporator while bypassing the condenser and the first press-reducing unit during a heating mode, a second press-reducing unit disposed in the hot-gas bypass passage for decompressing refrigerant discharged from the compressor, and a valve unit for switching a flow direction of refrigerant discharged from the compressor. In the vehicle air conditioner, when the heating mode is set, the double layer flow mode is set. Thus, even when re-evaporation of condensed water on the heater exchanger is generated during the heating mode, vaporized water is mainly blown toward the lower side of the passenger compartment from the foot opening and is hardly blown toward a windshield from the defroster opening, because inside air has a greatly high absolute humidity as compared with outside air. As a result, it can prevent the windshield from being fogged due to vaporization of the condensed water on the heat exchanger.

Further, the double layer flow mode is set when temperature of outside air is lower than a predetermined temperature during the cooling mode. Therefore, even when the heating mode of the refrigerant cycle is selected immediately after the cooling mode of the refrigerant cycle when the temperature of outside air is lower than the predetermined temperature, humidity of air blown toward the windshield is sufficiently restricted.

Preferably, during the cooling mode, the valve unit opens the inlet side of the condenser and closes the inlet side of the hot-gas bypass passage. Further, during the heating mode, the valve unit closes the inlet side of the condenser and opens the inlet side of the hot-gas bypass passage. Thus, the cooling mode and the heating mode of the refrigerant cycle are readily switched in the heat exchanger.

BRIEF DESCRIPTION OF THE DRAWINGS

Additional objects and advantages of the present invention will be more readily apparent from the following detailed description of a preferred embodiment when taken together with the accompanying drawings, in which.

DETAILED DESCRIPTION OF THE PRESENTLY PREFERRED EMBODIMENT

Figure 1:
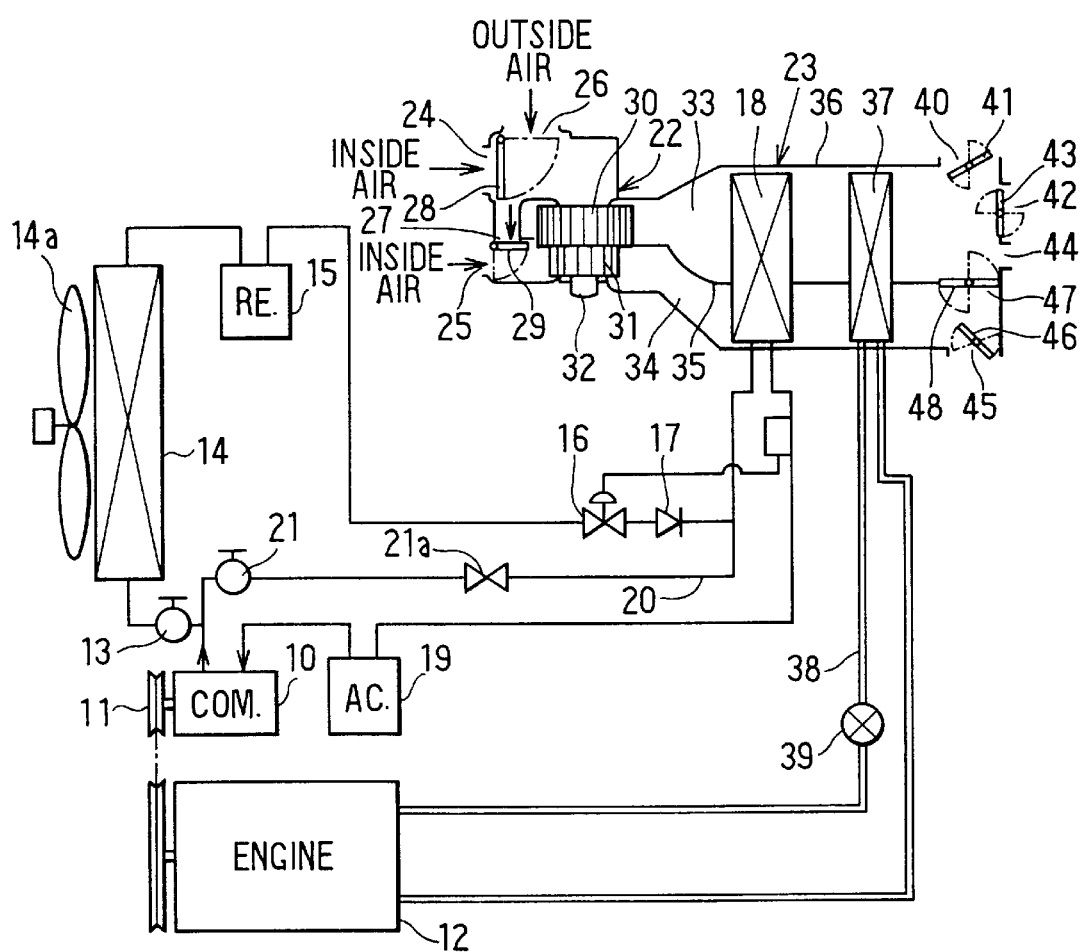
FIG. 1 is a schematic view showing a vehicle air conditioner according to a preferred embodiment of the present invention.

A preferred embodiment of the present invention will be described hereinafter with reference to the accompanying drawings. As shown in FIG. 1, a compressor 10 is driven by a vehicle engine 12 through an electromagnetic clutch 11. A refrigerant discharge side of the compressor 10 is connected to a condenser 14 through a first electromagnetic valve 13, and a refrigerant outlet side of the condenser 14 is connected to a receiver 15 in which liquid refrigerant is separated from gas refrigerant and is stored therein. Outside air outside the passenger compartment is blown toward the condenser 14 by an electrically driven cooling fan 14a. A refrigerant outlet side of the receiver 15 is connected to a thermal expansion valve 16, and a refrigerant outlet side of the thermal expansion valve (first press-reducing unit) 16 is connected to an evaporator 18 through a check valve 17. A refrigerant outlet side of the evaporator 18 is connected to a refrigerant suction side of the compressor 10 through an accumulator 19. A valve opening degree of the thermal expansion valve 16 is adjusted so that a super-heating degree of refrigerant at the refrigerant outlet side of the evaporator 18 is set at a predetermined degree. Gas refrigerant and liquid refrigerant are separated in the accumulator 19, and liquid refrigerant is stored in the accumulator 19. In the accumulator 19, gas refrigerant and a little liquid refrigerant containing oil are sucked into the compressor 10.

On the other hand, a hot-gas bypass passage 20 through which refrigerant bypasses the condenser 14 is provided between the refrigerant discharge side of the compressor 10 and the refrigerant inlet side of the evaporator 18. In the hot-gas bypass passage 20, a second electromagnetic valve 21 for heating and a throttle (second press reducing unit) 21a are arranged in series. The throttle 21a is a fixed throttle member such as an orifice and a capillary.

Next, a ventilation system of the vehicle air conditioner will be now described. The ventilation system of the air conditioner includes a blower unit 22 and an air conditioning unit 23. The blower unit 22 has first and second inside air introduction ports 24, 25 for introducing inside air (i.e., air inside the passenger compartment), one outside air introduction port 26 for introducing outside air (i.e., air outside the passenger compartment), and a communication path 27. The first inside air introduction port 24 and the outside air introduction port 26 are opened and closed by a first inside/outside air switching door 28, and the communication path 27 and the second inside air introduction port 25 are opened and closed by a second inside/outside air switching door 29.

Each of the first and second inside/outside air switching doors 28, 29 is a plate-like door, and is operatively linked with an actuator 60 (FIG. 2) using a servomotor, through a link mechanism. In the blower unit 22, a first fan 30 and a second fan 31 for blowing air introduced from the inside/outside air introduction ports 24, 25, 26 are disposed. Each of the first and second fans 30, 31 is a centrifugal fan (sirocco fan), and both the first and second fans 30, 31 are integrally rotated by an electrical motor 32.

FIG. 1 shows an inside/outside air double layer flow mode (hereinafter, referred to as "double layer flow mode") of the vehicle air conditioner. During the double layer flow mode, because the first inside/outside air switching door 28 closes the first inside air introduction port 24 and opens the outside air introduction port 26, outside air is sucked into the first fan 30. Further, because the second inside/outside air switching door 29 opens the second inside air introduction port 25 and closes the communication path 27, inside air is sucked into the second fan 31. Thus, during the double layer flow mode, outside air sucked from the outside air introduction port 26 is blown into a first air passage 33 by the first fan 30, and inside air sucked from the second inside air introduction port 25 is blown into a second air passage 34 by the second fan 31. The first and second air passages 33, 34 are partitioned by a partition plate 35 so that the first air passage 33 is placed on a vehicle upper side of the second air passage 34.

The air conditioning unit 23 includes the evaporator 18 and a hot water type heater core 37 disposed integrally within an air conditioning case 36. An air passage within the air conditioning case 36 is also partitioned by the partition plate 35 into the first air passage 33 on a vehicle upper side and the second air passage 34 on a vehicle lower side.

During a cooling mode in summer or a dehumidifying mode, the evaporator 18 cools air passing therethrough. On the other hand, during a heating mode in winter, high-temperature refrigerant gas (hot-gas refrigerant) from the hot-gas bypass passage 20 flows into the evaporator 18 to heat air passing through the evaporator 18 by heat radiated from the hot-gas refrigerant. In this case, the evaporator 18 is used as a radiator.

The heater core 37 is disposed adjacently at a downstream air side of the evaporator 18 within the air conditioning case 36, and heats air having passed through the evaporator 18. High-temperature hot water (engine-cooling water) from the vehicle engine 12 flows into the heater core 37 to heat air passing through the heater core 37 using hot water as a heating source. In each of the evaporator 18 and the heater core 37, plural flat tubes, each of which is formed by connecting two metal thin plates made of aluminum or the like to each other, are laminated to sandwich a corrugated fin between adjacent flat tube, and then integrally brazed.

A water valve 39 for adjusting a flow amount of hot water flowing into the heater core 37 is disposed in a water circuit 38 through which hot water circuits between the vehicle engine 12 and the heater core 37. In the embodiment of the present invention, temperature of air blown into the passenger compartment is adjusted by adjusting the flow amount of hot water flowing into the heater core 37.

Further, a mode switching portion is disposed at a downstream air side of the air conditioning case 36. That is, a defroster opening 40 communicating with the first air passage 33 at an immediately downstream air position of the heater core 37 is formed on an upper surface of the air-conditioning case 36. The defroster opening 40 is provided for blowing air toward an inner surface of a windshield through a defroster duct and a defroster air outlet (not shown). The defroster opening 40 is opened and closed by a rotatable butterfly defroster door 41.

A center face opening 42 communicating with the first air passage 33 is formed on an upper side position of the air conditioning case 36 adjacent to the defroster opening 40. The center face opening 42 is provided for blowing air toward the head portion of a passenger in the passenger compartment through a face duct from a center face air outlet provided on a vehicle instrument panel portion. The center face opening 42 is opened and closed by a rotatable butterfly face door 43.

Adjacent to the center face opening 42, a side face opening 44 is provided for blowing air toward the head portion of the passenger and the inner surface of the windshield through a face duct from a side face air outlet provided on right and left both sides of the vehicle instrument panel portion. In any one of air outlet modes, the side face opening 44 always communicates with the first air passage 33.

Further, a foot opening 45 is provided at a lower side of the air conditioning case 36. The foot opening 45 communicates with the second air passage 34 at a downstream air side of the heater core 37. The foot opening 45 is provided for blowing air toward the foot area of the passenger in the passenger compartment from a foot air outlet (not shown) through a foot duct (not shown). The foot opening 45 is opened and closed by a rotatable butterfly foot door 46.

A communication path 47 through which the first air passage 33 and the second air passage 34 communicate with each other is provided in the partition plate 35 at a downstream air side of the heater core 37. The communication path 47 is opened and closed by a rotatable butterfly communication door 48. The defroster door 41, the face door 43 and the foot door 46 are operated by an actuator 61 (FIG. 2) using a servomotor through a link mechanism (not shown). Further, the hot water valve 39 is operated by an actuator 62 (FIG. 2) using a servomotor through a link mechanism.

Further, the communication door 48 is operatively linked with an inside/outside air switching unit. When the inside/outside air switching unit is operated at a position of the double layer flow mode, the communication door 48 is operated to close the communication path 47 and to partition the first and second air passages 33, 34 from each other. On the other hand, when the inside/outside air switching unit is operated at a position of an entire outside air mode or an entire inside air mode, the communication door 48 opens the communication path 47.

Figure 2:
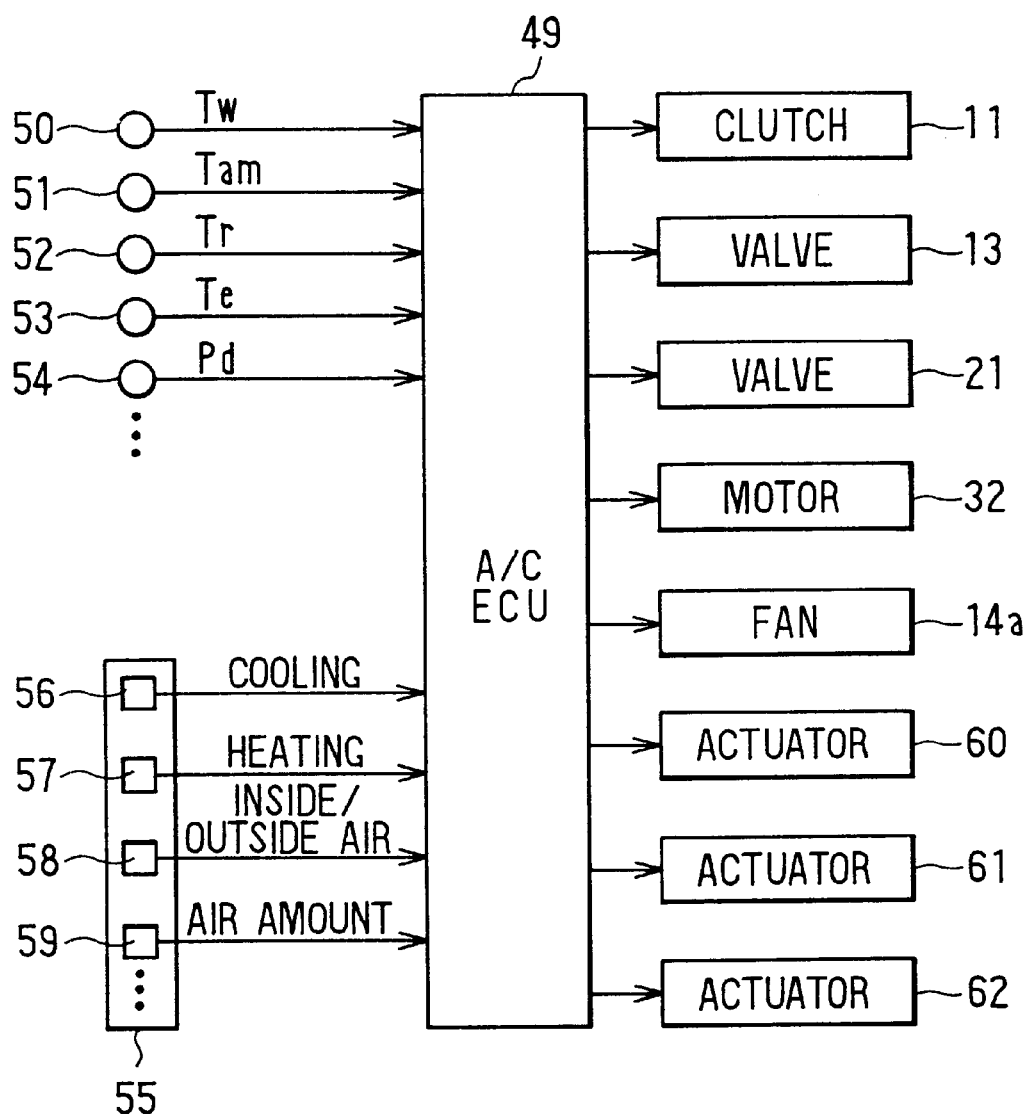
FIG. 2 is a block diagram of a control unit of the vehicle air conditioner according to the embodiment.

FIG. 2 is a block diagram of an air-conditioning electronic control unit (ECU) 49 composed of a microcomputer and electrical circuits. The ECU 40 controls operations of the electromagnetic clutch 11, the first and second electromagnetic valves 13, 21 and the other equipments such as the blower motor 32, the cooling fan 14a and the actuators 60–62 based on input signals.

Signals detected from a sensor group are input into the ECU 49. The sensor group includes a water temperature sensor 50 for detecting a temperature Tw of hot water from the vehicle engine 12, an outside air temperature sensor 51 for detecting outside air temperature Tam, an inside air temperature sensor 52 for detecting inside air temperature Tr, a temperature sensor 53 for detecting temperature Te of air blown from the evaporator 18, and a pressure sensor 54 for detecting pressure Pd of refrigerant discharged from the compressor 10. Further, switch signals from an air-conditioning operation panel 55 disposed around the vehicle instrument panel are input into the ECU 49. On the air-conditioning operation panel 55, an operation switch group is provided. The operation switch group includes a cooling switch 56 for setting a cooling mode, a heating switch 57 for setting a heating mode with a hot-gas refrigerant bypass, an inside/outside air switch 58 for setting an inside/outside air mode, and an air amount operation switch 59 for controlling the blower mode 32.

Next, operation of the vehicle air conditioner according to the embodiment is described. When the cooling switch 56 on the air-conditioning operation panel 55 is turned on and the cooling mode is set, the first electromagnetic valve 13 is opened and the second electromagnetic valve 21 is closed by the ECU 49. Further, the electromagnetic clutch 11 is turned on so that the compressor 10 is driven by the vehicle engine 12. Thus, gas refrigerant discharged from the compressor 10 passes through the first electromagnetic valve 13 and flows into the condenser 14. Refrigerant flowing through the condenser 14 is cooled and condensed by outside air blown from the cooling fan 14a. Refrigerant from the condenser 14 flows into the receiver 15 so that gas refrigerant and liquid refrigerant are separated in the receiver 15. Only liquid refrigerant is introduced from the receiver 15 into the thermal expansion valve 16, and is press-reduced in the thermal expansion valve 16 so that low-temperature low-pressure gas-liquid refrigerant is obtained.

The low-temperature low-pressure refrigerant from the thermal expansion valve 16 passes through the check valve 17 and flows into the evaporator 18. Refrigerant flowing through the evaporator 18 absorbs heat from air blown by the first and second fans 30, 32 to evaporator 18. Therefore, air passing through the evaporator 18 is cooled by the evaporator 18, and is blown into the passenger compartment to cool the passenger compartment. Gas refrigerant evaporated in the evaporator 18 is sucked into the compressor 10 to be compressed after passing through the accumulator 19.

On the other hand, the heating switch 57 of the air-conditioning operation panel 55 is turned on and the heating mode is set, the first electromagnetic valve 13 is closed and the second electromagnetic valve 21 is opened by the ECU 49. Therefore, high-temperature high-pressure gas refrigerant discharged from the compressor 10 flows into the evaporator 18 after passing through the second electromagnetic valve 21 and being press-reduced in the throttle 21a. Here, the check valve 17 prevents gas refrigerant from flowing from the hot-gas bypass passage 20 into the thermal expansion valve 16.

Gas refrigerant decompressed in the throttle 21a is radiated in the evaporator 18 into air passing through the evaporator 18. Heat quantity radiated from gas refrigerant of the evaporator 18 corresponds to a compression amount of the compressor 10. Gas refrigerant having been radiated in the evaporator 18 is sucked into the compressor 10 through the accumulator 19. On the other hand, when temperature of hot water from the vehicle engine 12 increases, hot water flows into the heater core 37 through the water valve 39. Therefore, air having passed through the evaporator 18 is heated again in the heater core 37, and is blown into the passenger compartment to heat the passenger compartment.

Figure 3:
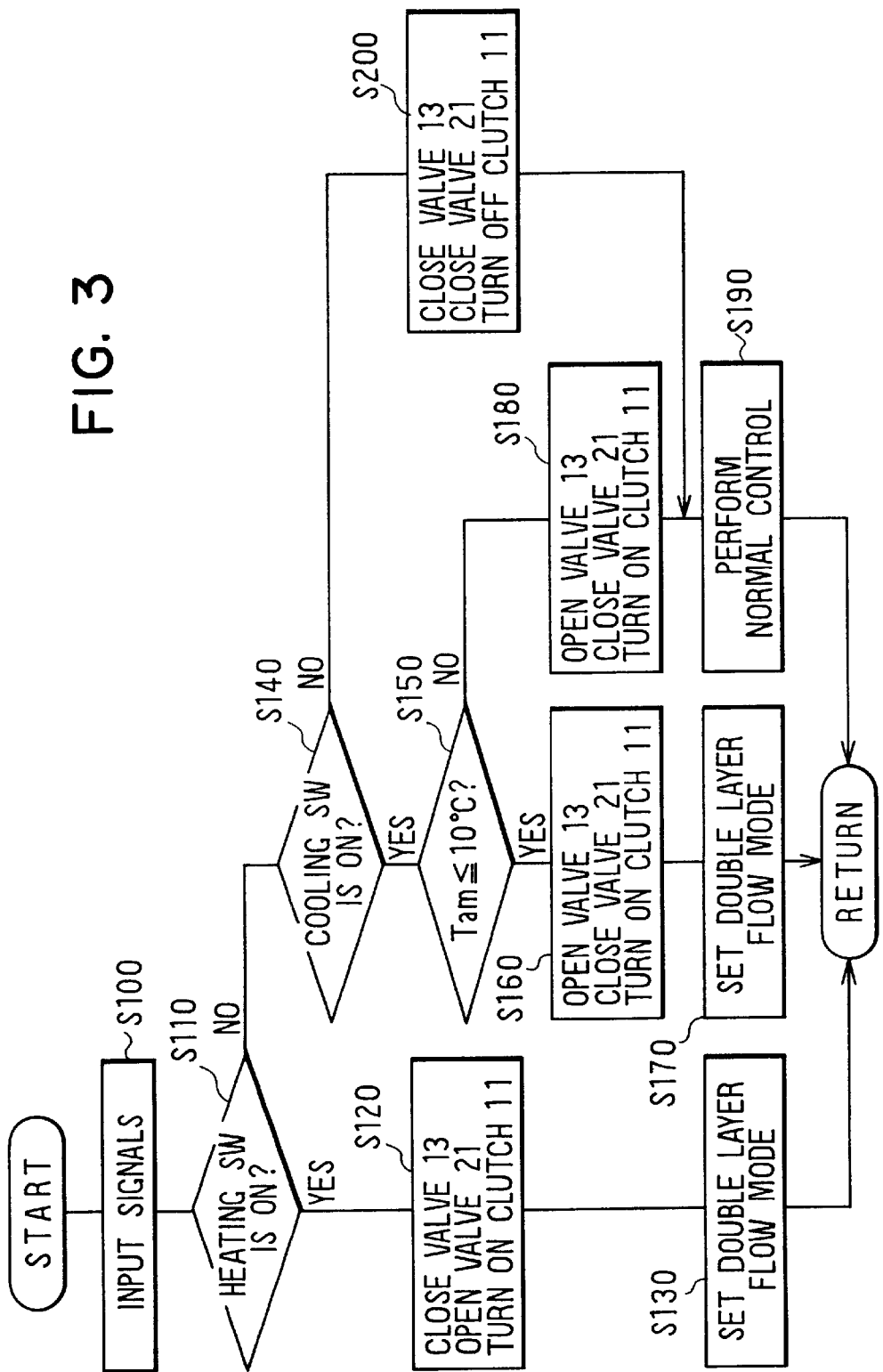
FIG. 3 is a flow diagram showing a control program of the control unit according to the embodiment.

The switching between the cooling mode and the heating mode of the refrigerant cycle is relative to an inside/outside air mode switching of the ventilation system of the vehicle air conditioner. Here, the relationship will be described with reference to FIG. 3. When an ignition switch of the vehicle engine 12 is turned on and an operation switch such as the switch 59 on the air-conditioning control panel 55 is turned on, the control routine shown in FIG. 3 starts. First, at step S100 in FIG. 3, signals from the sensor group 50–54 and signals from operation switch group 56–59 on the air-conditioning operation panel 55 are input.

Next, at step S110, it is determined whether or not the heating switch 57 is turned on. That is, it is determined whether or not the operation of the refrigerant cycle is hot-gas refrigerant operation where hot-gas refrigerant flows from the compressor 10 into the evaporator 18 while bypassing the condenser 14. When the heating switch 57 is turned on at step S110, the program performs step S120. At step S120, the first electromagnetic valve 13 is closed, the second electromagnetic valve 21 is opened, and the electromagnetic clutch 11 is turned on. Next, at step S130, the double layer flow mode is set. During the double layer flow mode, as shown in FIG. 1, the fist inside/outside air switching door 28 opens the outside air introduction port 26 and closes the first inside air introduction port 24, the second inside/outside air switching door 29 opens the second inside air introduction port 25 and closes the communication path 27, and the communication door 48 closes the communication path 47. Therefore, outside air sucked from the outside air introduction port 26 is blown into the first air passage 33 by operation of the first fan 30, and inside air sucked from the second inside air introduction port 25 is blown into the second air passage 34 by operation of the second fan 31. During the double layer flow mode, outside air and inside air are respectively heated in the evaporator 18 by heat radiated from high-temperature gas refrigerant, and thereafter are further heated in the heater core 37 respectively.

During heating mode in winter, an air outlet mode such as a foot mode and a foot/defroster mode, where both the defroster opening 40 and the foot opening 45 are opened, is set. Therefore, heated outside air in the first air passage 33 is blown toward the inner surface of the windshield from the defroster opening 40 and the side face opening 44 so that the windshield is defrosted or defogged. Simultaneously, heated inside air in the second air passage 34 is blown toward the foot area of the passenger in the passenger compartment from the foot opening 45.

On the other hand, when the heating switch 57 is not turned on, that is, when the heating switch 57 is turned off at step S110, it is determined whether or not the cooling switch 56 is turned on at step S140. When the cooling switch 56 is turned on at step S140, it is determined whether or not outside air temperature Tam is equal to or lower than a predetermined temperature (e.g., 10° C.) at step S150. When the outside air temperature Tam is not higher than the predetermined temperature (e.g., 10° C.) the program performs step S160 and the cooling mode of the refrigerant cycle is set. That is, at step S160, the first electromagnetic valve 13 is opened, the second electromagnetic valve 21 is closed, and the electromagnetic clutch 11 is turned on. Next, at step S170, the double layer flow mode is set. During the double layer flow mode, as shown in FIG. 1, the first inside/outside air switching door 28 opens the outside air introduction port 26 and closes the first inside air introduction port 24, the second inside/outside air switching door 29 opens the second inside air introduction port 25 and closes the communication path 27, and the communication door 48 closes the communication path 47.

In this case, because the outside air temperature is low, the foot mode or the foot/defroster mode is set similarly to the heating mode of the refrigerant cycle. Therefore, heated outside air in the first air passage 33 is blown toward the inner surface of the windshield from the defroster opening 40 and the side face opening 44 so that the windshield is defrosted or defogged. Simultaneously, heated inside air in the second air passage 34 is blown toward the foot area of the passenger in the passenger compartment from the foot opening 45. Even when the outside air temperature Tam is low, because the cooling mode of the refrigerant cycle is set so that air passing through the evaporator 18 is cooled and dehumidified, defrosting performance of the windshield can be improved.

When the outside air temperature Tam is higher than the predetermined temperature (e.g., 10° C.) at step S150, the program performs step S180 and the cooling mode of the refrigerant cycle is set. Therefore, similarly to step S160, the first electromagnetic valve 13 is opened, the second electromagnetic valve 21 is closed, and the electromagnetic clutch 11 is turned on. Thereafter, at step S190, a normal control of the inside/outside air mode is performed. That is, the entire outside air mode or the entire inside air mode is set by the inside/outside air switch 58 or is automatically controlled so that operation positions of the first and second inside/outside air switching doors 28, 29 and the communication door 48 are set. During the entire inside air mode or the entire outside air mode, the communication door 48 opens the communication path 47.

When the cooling switch 57 is not turned on, that is, the cooling switch 57 is turned off at step S140, the program performs step S200 and operation of the refrigerant cycle is stopped. That is, at step S200, the first electromagnetic valve 13 is closed, the second electromagnetic valve 21 is closed, and the electromagnetic clutch 11 is turned off. Next, at step S190, the normal control of the inside/outside air mode is performed.

The heating mode of the refrigerant cycle with the hot-gas refrigerant bypassing is generally set when the outside air temperature is low. Thus, when the outside air temperature Tam is lower than a predetermined temperature (e.g., 10° C.), the double layer flow mode is set, even when the refrigerant cycle is set to the heating mode where the evaporator 18 is used as a radiator, or the cooling mode where the evaporator 18 is used as a cooling unit.

During the double layer flow mode, due to a humidification by the passenger's breath, the absolute humidity of inside air in the second air passage 34 is greatly higher as compared with the absolute humidity of outside air in the first air passage 33. Thus, in the cooling mode of the refrigerant cycle, by the cooling and dehumidifying operations of the evaporator 18, a large part condensed water is generated in the second air passage 34 while condensed water is hardly generated in the first air passage 33. Thus, even when the heating mode of the refrigerant cycle is set immediately after the cooling mode of the refrigerant cycle so that the evaporator 18 is used as a radiator and the condensed water is re-vaporized, the vaporized water is only blown toward the foot area of the passenger from the foot opening 45, and is not blown toward the windshield from the defroster opening 40 and the side face opening 44. Thus, even when the operation mode of the refrigerant cycle is switched between the cooling mode and the heating mode, it can effectively prevent the windshield from being fogged due to the vaporization of the condensed water of the evaporator 18.

Although the present invention has been fully described in connection with the preferred embodiment thereof with reference to the accompanying drawings, it is to be noted that various changes and modifications will become apparent to those skilled in the art.

For example, in the above-described embodiment of the present invention, a single valve unit having a function for switching plural refrigerant passages may be used instead of both first and second electromagnetic valves 13, 21.

In the above-described embodiment of the present invention, the vehicle air conditioner has the manually operated heating switch 57 especially provided on the air-conditioning operation panel. However, in a vehicle having a manual switch for performing an idling-up control of the vehicle engine 12, with a turning-on operation of the manual switch, the heating mode with the hot-gas refrigerant bypassing of the refrigerant cycle may be performed.

In the above-described embodiment of the present invention, the water valve 39 for adjusting the flow amount of hot water flowing into the heater core 13 is disposed in the water circuit 38 through which hot water circulates between the heater core 37 and the engine 12, so that the temperature of air blown into the passenger compartment is adjusted. However, the present invention may be applied to an air conditioning unit where temperature of air blown into the passenger compartment is adjusted by adjusting a flow ratio of air passing through the heater core 37 and air bypassing the heater core 37.

In the above-described embodiment, the outside air temperature sensor 51 is provided and it is determined whether or not the outside air temperature Tam is low based on the detected signal of the outside air temperature sensor 51. However, in a vehicle having a calendar unit indicating month and day, it may be determined that the outside air temperature is low in a season from November to March.

Further, the present invention may be applied to an air conditioner having a fixed-capacity type compressor where the capacity is not changed or having a variable-capacity type compressor where the capacity is changed. Further, the compressor may be driven by a driving unit instead of the vehicle engine 14.

Such changes and modifications are to be understood as being within the scope of the present invention as defined by the appended claims.

What is claimed is:

1. An air conditioner for a vehicle having an engine and a passenger compartment, said air conditioner comprising:
   an air conditioning case for defining an air passage through which air is blown into the passenger compartment, said air conditioning case having a first opening through which air is blown toward a windshield and a second opening through which air is blown toward a lower side of the passenger compartment;
   a partition member for partitioning said air passage into a first air passage through which outside air outside the passenger compartment flows into said first opening and a second air passage through which inside air inside the passenger compartment flows into said second opening, during a double layer flow mode;
   a compressor for compressing and discharging refrigerant;
   a condenser for condensing refrigerant discharged from said compressor during a cooling mode;
   a first press-reducing unit for decompressing refrigerant from said condenser;
   a heat exchanger disposed in said air conditioning case, for cooling air passing therethrough and for evaporating refrigerant from said first press-reducing unit during said cooling mode;
   a refrigerant duct for defining a hot-gas bypass passage through which refrigerant discharged from said compressor is directly introduced into said heat exchanger while bypassing said condenser and said first press-reducing unit during a heating mode;
   a second press-reducing unit, disposed in said hot-gas bypass passage, for decompressing refrigerant discharged from said compressor;
   a valve unit for switching a communication between a refrigerant discharged side of said compressor and a refrigerant inlet side of said compressor and a refrigerant inlet side of said condenser, and a communication between the refrigerant discharge side of said compressor and a refrigerant inlet side of said hot-gas bypass passage; and
   a control unit for setting said double layer flow mode during said heat mode; wherein:
      in said cooling mode, said control unit sets said double layer flow mode only when temperature of outside air is lower than a predetermined temperature.

2. The air conditioner according to claim 1, wherein:
   during said cooling mode, said valve unit opens said refrigerant inlet side of said condenser and closes said refrigerant inlet side of said hot-gas bypass passage; and
   during said heating mode, said valve unit closes said refrigerant inlet side of said condenser and opens said refrigerant inlet side of said hot-gas bypass passage.

3. The air conditioner according to claim 1, wherein said compressor is driven by the engine.

4. The air conditioner according to claim 1, further comprising
   an inside/outside air switching unit for introducing outside air into said first air passage and inside air into said second air passage simultaneously, during said double layer flow mode.

5. The air conditioner according to claim 1, further comprising
   a switching door for opening and closing said first opening and said second opening.

6. The air conditioner according to claim 1, further comprising:
   an outside air temperature sensor for detecting the temperature of outside air,
   wherein said control unit determines that the temperature of outside air is lower than the predetermined temperature based on temperature detected by said outside air temperature sensor.

7. The air conditioner according to claim 1, wherein said control unit determines that the temperature of outside air is lower than the predetermined temperature based on a signal from a calendar disposed in the vehicle.

8. The air conditioner according to claim 1, wherein:
   said control unit includes a heating switch for setting said heating mode; and
   said heating mode is set when the heating switch is turned on.

9. The air conditioner according to claim 1, wherein:
   said control unit includes a cooling switch for setting said cooling mode; and said cooling mode is set when the cooling switch is turned on.

10. The air conditioner according to claim 1, further comprising:

a heater core, disposed in said air conditioning case at a downstream air side of said heat exchanger, for heating air passing therethrough.

11. The air conditioner according to claim 1, wherein said valve unit includes a first electromagnetic valve disposed between said compressor and said condenser, and a second electromagnetic valve disposed in said hot-gas bypass passage at an upstream refrigerant side of said second pressreducing unit.

12. The air conditioner according to claim 1, wherein said first air passage is provided at an upper side of said second air passage.

* * * * *